(12) United States Patent
Van Neste

(10) Patent No.: US 8,009,030 B2
(45) Date of Patent: Aug. 30, 2011

(54) AUTOMOBILE COMMUNICATION SYSTEM

(76) Inventor: Kenneth J. Van Neste, Hampstead, NC (US)

( * ) Notice: Subject to any disclaimer, the term of this patent is extended or adjusted under 35 U.S.C. 154(b) by 270 days.

(21) Appl. No.: 12/418,716

(22) Filed: Apr. 6, 2009

(65) Prior Publication Data

US 2010/0013623 A1   Jan. 21, 2010

(51) Int. Cl.
*B60Q 1/26* (2006.01)
(52) U.S. Cl. ...................................................... 340/468
(58) Field of Classification Search .................. 340/468, 340/466, 467, 479, 464
See application file for complete search history.

(56) References Cited

U.S. PATENT DOCUMENTS

| | | | |
|---|---|---|---|
| 5,410,294 A | 4/1995 | Gold | |
| 5,486,808 A * | 1/1996 | Nejdl | 340/464 |
| 6,121,896 A * | 9/2000 | Rahman | 340/902 |
| 6,335,681 B1 * | 1/2002 | Ontiveros et al. | 340/466 |
| 6,870,474 B1 | 3/2005 | Brothers | |
| 6,985,089 B2 * | 1/2006 | Liu et al. | 340/903 |
| 7,821,381 B2 * | 10/2010 | Curtis | 340/425.5 |

* cited by examiner

*Primary Examiner* — Phung Nguyen
(74) *Attorney, Agent, or Firm* — Dale J. Ream

(57) ABSTRACT

A communication system for use with an automobile having an accelerator, a brake, a cruise control, and a brake lamp includes a display, a transmitter, a receiver, and a cruise lamp visible from outside the automobile. The communication system includes a processor in data communication with the accelerator, the brake, the cruise control, the brake lamp, the display, the transmitter, the receiver, and the cruise lamp. The processor includes programming to actuate the display to present data received by the receiver and to actuate the cruise lamp when the cruise control is actuated. The processor also includes programming to actuate the transmitter to transmit cruise data when the cruise control is actuated. Programming also causes the cruise lamp to blink when the cruise control is actuated while the accelerator is actuated. Programming may also actuate the transmitter to transmit acceleration data when the cruise control and the accelerator are actuated.

9 Claims, 3 Drawing Sheets

AUTOMOBILE COMMUNICATION SYSTEM

CROSS REFERENCE TO RELATED APPLICATION

This non-provisional patent application claims the benefit of provisional application Ser. No. 61/135,596 filed on Jul. 21, 2008 titled Courtesy Cruise Light.

BACKGROUND OF THE INVENTION

This invention relates generally to communication systems and, more particularly, to an automobile communication system that utilizes input from an automobile cruise control, accelerator, and brake systems to activate, deactivate, and control a cruise control light positioned on or in proximity to the automobile's rear window brake light.

Automobile cruise control systems have become standard on modern automobiles. Such systems enable drivers to maintain a consistent speed without manipulating the accelerator or brake pedals. Of course, there are occasions when the cruise control must be turned off such as when traffic is heavy or when rapid braking is needed due to speed variations of other vehicles. Another difficulty with cruise control is that other drivers are unable to discern if another vehicle is using its cruise control. In other words, other drivers might change their own driving behavior if they know that a surrounding vehicle is using cruise control and, as a result, may not be as quick to respond to sudden speed variations of other vehicles.

Therefore, it would be desirable to have an automobile communication system that energizes a light positioned near a rear window brake light when the vehicle cruise control system is activated. Further, it would be desirable to have an automobile communication system that transmits a signal for receipt by surrounding vehicles indicating that the transmitting automobile is utilizing cruise control.

SUMMARY OF THE INVENTION

This essence of this invention is to activate a cruise control light whenever the vehicle's cruise control system is activated so that other vehicles are put on notice that the first vehicle's cruise control is in use. Then, if the first vehicle activates the acceleration feature of the cruise control or even manually accelerates in speed, the cruise light is energized to strobe, blink, or otherwise be modified to put surrounding vehicles on notice of the acceleration. Conversely, the cruise light is temporarily de-energized to notify surrounding drivers that the first car is slowing down, at least temporarily. Encouraging the use of cruise control promotes the conservation of fuel in that less fuel is used when a constant speed is maintained.

A major object of the present invention is to encourage and urge other drivers to participate in the benefits of using cruise control. Beyond that, there is a desire to promote a sense of community and togetherness surrounding the use of cruise control. To that end, another aspect of this system will be to enable each cruise light system to communicate with other nearby communication systems while driving. In other words, each system will transmit its presence and when it is accelerating or coasting such that all other nearby systems are put on notice and may even be able to graphically display the location of other nearby systems and their current status (e.g. if their cruise control is on, is accelerating, or is coasting). This will enable all participating drivers to become safer drivers by having more information available while driving. In fact, it is contemplated that the system may utilize GPS technology to identify the exact locations of nearby vehicles that have independently been identified as using respective cruise control systems. This information may be displayed for the driver to know not only which nearby vehicles are using cruise control, but whether they are maintaining a safe driving distance.

According to a preferred embodiment of the present invention, a communication system for use with an automobile having an accelerator, a brake, a cruise control, and a brake lamp includes a display, a transmitter, a receiver, and a cruise lamp visible from outside the automobile. The communication system includes a processor in data communication with the accelerator, the brake, the cruise control, the brake lamp, the display, the transmitter, the receiver, and the cruise lamp. The processor includes programming to actuate the display to present data received by the receiver and to actuate the cruise lamp when the cruise control is actuated. The processor also includes programming to actuate the transmitter to transmit cruise data when the cruise control is actuated. Programming also causes the cruise lamp to blink when the cruise control is actuated while the accelerator is actuated. Programming may also actuate the transmitter to transmit acceleration data when the cruise control and the accelerator are actuated.

Therefore, a general object of this invention is to provide a communication system for an automobile that visually indicates to the drivers of other vehicles in the proximity of the equipped automobile that the equipped automobile's cruise control system is activated.

Another object of this invention is to provide an automobile communication system, as aforesaid, that transmits a signal to other vehicles in its proximity that its cruise control is activated.

Still another object of this invention is to provide an automobile communication system, as aforesaid, that receives signals from other equipped vehicles in its proximity that respective cruise controls are activated.

Yet another object of this invention is to provide an automobile communication system, as aforesaid, that transmits and receives signals indicative of vehicle acceleration and deceleration and displays received data.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
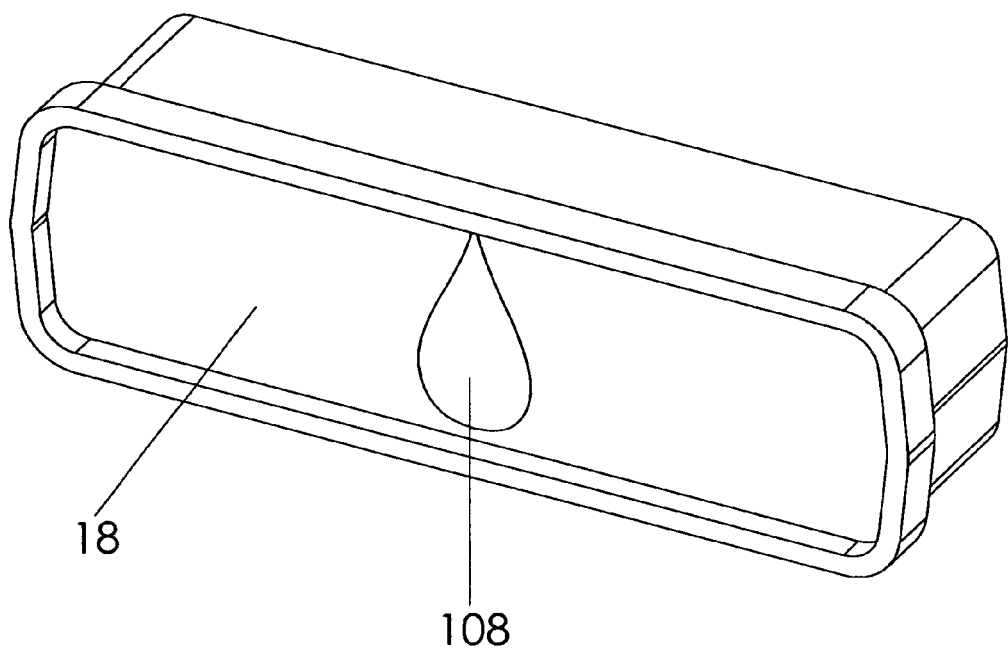
FIG. 1 is a perspective view of an automobile rear window brake light and cruise light according to a preferred embodiment of the present invention.

An automobile communication system will now be described in detail with reference to FIG. 1 through FIG. 3 of the accompanying drawings. More particularly, a communication system 100 of one embodiment for use with an automobile having an accelerator 12, a brake 14, a cruise control 16, and a brake lamp 18 includes a display 102 (e.g., a visual display that can be seen inside the automobile), a transmitter 104, a receiver 106, a cruise lamp 108, and a processor 110.

The cruise lamp 108 is visible from outside the automobile. In some embodiments, the cruise lamp 108 is installed in the automobile during manufacture of the automobile. As shown in FIG. 1, the cruise lamp 108 may be teardrop shaped and located inside the brake lamp 18.

Figure 2:
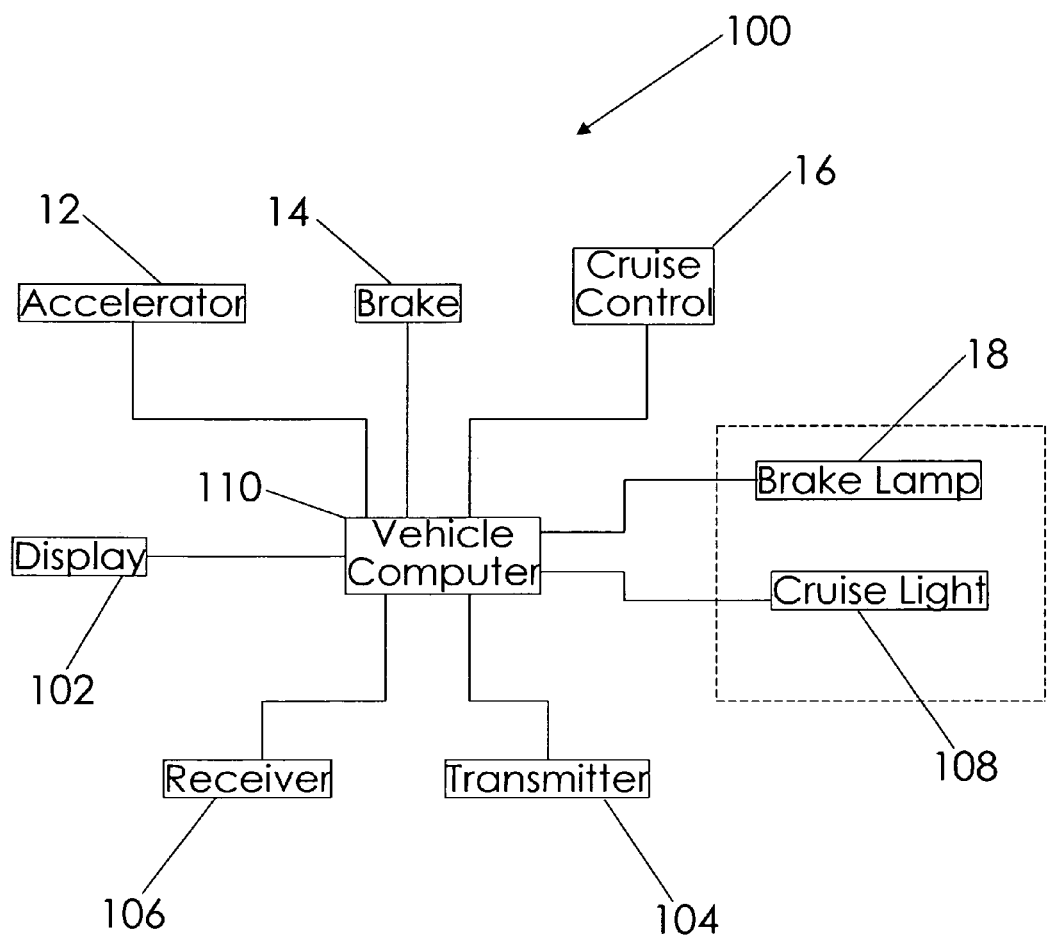
FIG. 2 is a block diagram of the electronic components of the present invention.
Figure 3:
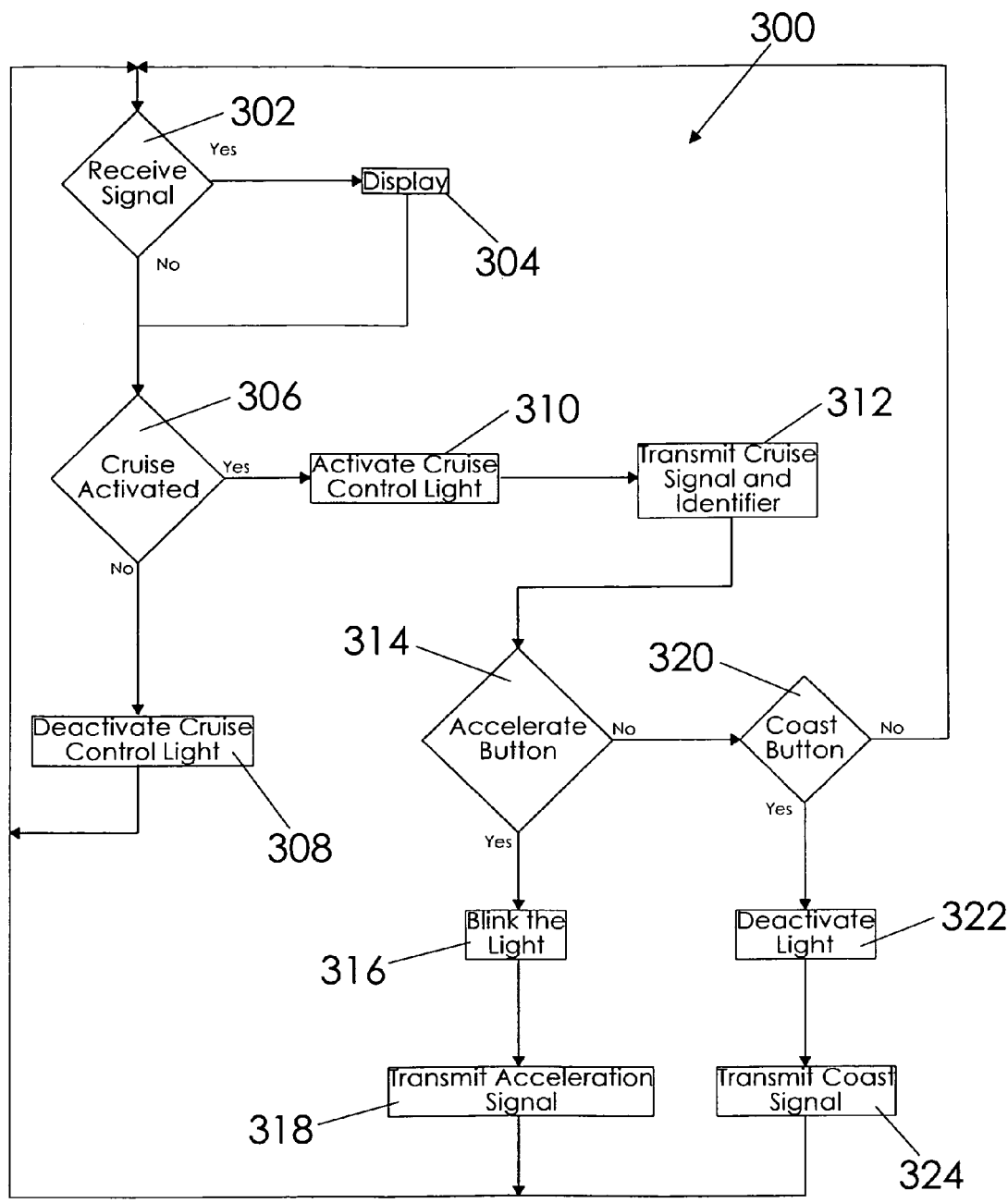
FIG. 3 is a flowchart illustrating the logic performed by the processor according to the present invention.

As shown in FIG. 2, the processor 110 is in data communication with the accelerator 12, the brake 14, the cruise control 16, the brake lamp 18, the display 102, the transmitter 104, the receiver 106, and the cruise lamp 108. The processor 110 includes various programming, some of which is described in process 300 (FIG. 3).

At step 302 of the process 300, the processor 110 determines if the receiver 106 has received data from a remote transmitter (i.e., a transmitter from a communication system of another automobile). If so, the processor 110 actuates the display 102 at step 304 to convey the data and then proceeds to step 306. For example, the display 102 may indicate that an adjacent automobile is utilizing its cruise control. If the receiver 106 has not received data from a remote transmitter, the process 300 proceeds from step 302 to step 306.

At step 306, the processor 110 determines if the cruise control 16 is actuated. If not, the process 300 proceeds to step 308, where the processor 110 deactivates the cruise lamp 108 if the cruise lamp 108 was previously actuated, and then the process 300 returns to step 302. If the cruise control 16 is actuated, the process 300 continues from step 306 to step 310.

At step 310, the processor 110 actuates the cruise lamp 108, and the process 300 continues to step 312. At step 312, the processor 110 actuates the transmitter 104 to transmit cruise data (i.e., data indicating that the cruise control 16 is actuated) to adjacent automobiles, and the process 300 continues to step 314.

At step 314, the processor 110 determines if the accelerator 12 is actuated. The accelerator 12 may be, for example, an acceleration feature that is part of the automobile's cruise control 16 or an accelerator pedal. If the accelerator 12 is actuated, the process 300 proceeds to step 316; if not, the process 300 continues to step 320.

At step 316, the processor 110 causes the cruise lamp 108 to blink to indicate to adjacent automobiles that both the cruise control 16 and the accelerator 12 are actuated. The process 300 continues from step 316 to step 318, where the processor 110 actuates the transmitter 104 to transmit cruise acceleration data (i.e., data indicating that both the cruise control 16 and the accelerator 12 are actuated) to adjacent automobiles, and the process 300 returns to step 302.

At step 320, the processor 110 determines if a coast (i.e., deceleration) setting of the cruise control 16 is actuated. If not, the process 300 returns to step 302; if so, the process 300 proceeds to step 322.

At step 322, the processor 110 causes the cruise lamp 108 to deactivate. The process 300 continues from step 322 to step 324, where the processor 110 actuates the transmitter 104 to transmit cruise coast data (i.e., data indicating that both the cruise control 16 and a coast setting are actuated) to adjacent automobiles, and the process returns to step 302.

It should be appreciated that, in returning to step 302 (e.g., from steps 308, 318, 320, and 324), the process 300 may operate in a continuous or near-continuous loop, and that changes may therefore be detected and addressed.

In use, then, other drivers may be alerted to the operation of the automobile through various manners. For example, a trailing driver may see that the cruise lamp 108 is actuated (e.g., at step 310) and know that the automobile is being piloted using its cruise control 16. Similarly, the trailing driver may see that the cruise lamp 108 is blinking (e.g., at step 316) and know that, while the automobile is being piloted using its cruise control 16, it is also accelerating. And the trailing driver may see that the cruise lamp 108 has been deactivated (e.g., at step 308 or step 322) and know that the cruise control 16 has been deactivated or that, though the automobile is being piloted using its cruise control 16, it is nevertheless operating at a coast setting. In addition, the transmission of data by the transmitter 104 (e.g., at steps 312, 318, and 324) may allow vehicles that are behind, beside, and even in front of the automobile to know whether the cruise control 16 is actuated, and if so, whether the automobile is nevertheless accelerating or coasting. More particularly, those vehicles may obtain the transmitted data using respective receivers, and the data may then be presented to those drivers (e.g., on a visual display, audibly, etc.). The automobile may be distinguished by the other vehicles in various ways. For example, the transmitted data may include identifying information (e.g., color, make, model, etc.) about the automobile.

By providing this additional information to other drivers, those other drivers may drive more safely. In addition, drivers may be encouraged to utilize their respective cruise controls by seeing others use cruise control. In other words, not only does the present system have the potential to increase the amount of useful information available on the roadways, but it also has the potential to connect many people together in a common bond of promoting the use of cruise control and highway safety. A more widespread use of cruise control may conserve fuel and also relieve some aggression from the roadways.

It is understood that while certain forms of this invention have been illustrated and described, it is not limited thereto except insofar as such limitations are included in the following claims and allowable functional equivalents thereof.

The invention claimed is:

1. A communication system for use with an automobile having an accelerator, a brake, a cruise control, and a brake lamp, said system comprising:
   a display;
   a transmitter;
   a receiver;
   a cruise lamp visible from outside said automobile;
   a processor in data communication with said accelerator, said brake, said cruise control, said brake lamp, said display, said transmitter, said receiver, and said cruise lamp;
   programming in said processor to actuate said display to present data received by said receiver;
   programming in said processor to actuate said cruise lamp when said cruise control is actuated;
   programming in said processor to actuate said transmitter to transmit cruise data when said cruise control is actuated;
   programming in said processor to cause said cruise lamp to blink when said cruise control is actuated while said accelerator is actuated; and
   programming in said processor to actuate said transmitter to transmit cruise acceleration data when said cruise control is actuated while said accelerator is actuated.

2. The system of claim 1, wherein said display is a visual display.

3. The system of claim 1, further comprising:
   programming in said processor to cause said cruise lamp to deactivate when said cruise control is actuated in a coast mode; and
   programming in said processor to actuate said transmitter to transmit cruise coast data when said cruise control is actuated in said coast mode.

4. The system of claim 3, wherein said display is a visual display.

5. The system of claim 4, wherein said cruise lamp is installed in said automobile during manufacture of said automobile.

6. The system of claim 5, wherein said cruise lamp is teardrop shaped and located inside said brake lamp.

7. The system of claim 1, further comprising:
   programming in said processor to cause said cruise lamp to deactivate when said cruise control is actuated in a coast mode; and
   programming in said processor to actuate said transmitter to transmit cruise coast data when said cruise control is actuated in said coast mode.

8. The system of claim 1, wherein said cruise lamp is installed in said automobile during manufacture of said automobile.

9. The system of claim 8, wherein said cruise lamp is teardrop shaped and located inside said brake lamp.

* * * * *